(12) United States Patent
Duncan et al.

(10) Patent No.: US 9,597,698 B2
(45) Date of Patent: Mar. 21, 2017

(54) MULTI-CHAMBER CONTAINER

(71) Applicant: COLGATE-PALMOLIVE COMPANY, New York, NY (US)

(72) Inventors: Kelly Gail Duncan, Washington, NJ (US); John C. Crawford, Mahopac, NY (US); Matthew Lee Kolb, Upper Black Eddy, PA (US)

(73) Assignee: Colgate-Palmolive Company, New York, NY (US)

( * ) Notice: Subject to any disclaimer, the term of this patent is extended or adjusted under 35 U.S.C. 154(b) by 0 days.

(21) Appl. No.: 14/443,586

(22) PCT Filed: Nov. 19, 2012

(86) PCT No.: PCT/US2012/065748
§ 371 (c)(1),
(2) Date: May 18, 2015

(87) PCT Pub. No.: WO2014/077842
PCT Pub. Date: May 22, 2014

(65) Prior Publication Data
US 2015/0306615 A1    Oct. 29, 2015

(51) Int. Cl.
*B05B 11/00* (2006.01)
*B65D 1/32* (2006.01)
(Continued)

(52) U.S. Cl.
CPC ........ *B05B 11/0037* (2013.01); *B05B 11/048* (2013.01); *B05B 11/3001* (2013.01);
(Continued)

(58) Field of Classification Search
CPC .............. B05B 11/0037; B05B 11/048; B05B 11/3084; B05B 11/3001; G01F 11/028;
(Continued)

(56) References Cited

U.S. PATENT DOCUMENTS 2,876,935 A    3/1959   Lindberg
3,347,420 A    10/1967  Donoghue
(Continued)

FOREIGN PATENT DOCUMENTS

CN    2 810 763    8/2006
EP    2 368 812    9/2011
(Continued)

OTHER PUBLICATIONS

International Search Report and the Written Opinion of the International Searching Authority issued in International Application PCT/US2012/065748 mailed Aug. 16, 2013.
(Continued)

*Primary Examiner* — Donnell Long (57) ABSTRACT

Provided is a multi-chamber dispenser (1) of flowable substances, comprising: a rigid body (100) disposed around first (113) and second (123) storage chambers for storing respective first and second flowable substances, a first inlet fluidly connecting the first storage chamber (113) with a first outlet (141), a second inlet fluidly connecting the second storage chamber (123) with a second outlet (151), a first user-operable apparatus (140) at an exterior of the container and configured, on movement relative to the rigid body (100), to cause a volume of the first flowable substance to be dispensed from the first storage chamber (113) via the first inlet to the first outlet (141), and a second user-operable apparatus (150) at the exterior of the container and configured, on movement relative to the rigid body (100), to cause a volume of the second flowable substance to be dispensed from the second storage chamber (123) via the second inlet to the second outlet (151).

31 Claims, 5 Drawing Sheets

(51) Int. Cl.
  *B65D 81/32* (2006.01)
  *B65D 83/00* (2006.01)
  *B65D 83/68* (2006.01)
  *G01F 11/02* (2006.01)
  *B05B 11/04* (2006.01)

(52) U.S. Cl.
  CPC .......... *B05B 11/3084* (2013.01); *B65D 1/323* (2013.01); *B65D 81/3288* (2013.01); *B65D 83/0094* (2013.01); *B65D 83/68* (2013.01); *G01F 11/028* (2013.01)

(58) Field of Classification Search
  CPC .... B65D 83/0094; B65D 83/68; B65D 1/323; B65D 81/3288
  USPC .............. 222/135, 209, 211, 212, 464.1, 478
  See application file for complete search history.

(56) References Cited

U.S. PATENT DOCUMENTS

| | | | |
|---|---|---|---|
| 3,581,940 A | 6/1971 | Cella | |
| 3,729,553 A | 4/1973 | Gold | |
| 4,065,536 A | 12/1977 | Lucas | |
| 4,279,349 A | 7/1981 | Aigner | |
| 5,137,178 A | 8/1992 | Stokes et al. | |
| 5,154,917 A | 10/1992 | Ibrahim | |
| 5,356,040 A | 10/1994 | Reggiani | |
| 5,482,170 A | 1/1996 | Semersky | |
| 5,573,143 A | 11/1996 | Deardurff | |
| 5,740,947 A | 4/1998 | Flaig et al. | |
| 5,899,360 A | 5/1999 | Mack | |
| 6,135,323 A | 10/2000 | Chen et al. | |
| 7,654,415 B2 * | 2/2010 | van der Heijden | B05B 11/3084 222/129 |
| 7,793,799 B2 * | 9/2010 | Reggiani | A45D 40/24 220/526 |
| 8,608,029 B2 | 12/2013 | Lee | |
| 2003/0008851 A1 | 1/2003 | Singh et al. | |
| 2003/0089738 A1 * | 5/2003 | Peterson | B05B 11/0078 222/135 |
| 2004/0026535 A1 * | 2/2004 | Conway | C11D 17/041 239/433 |
| 2004/0149775 A1 * | 8/2004 | Chen | A45D 34/00 222/135 |
| 2005/0127100 A1 | 6/2005 | Reggiani | |
| 2007/0029344 A1 * | 2/2007 | Schymitzek | B65D 23/102 222/129 |
| 2007/0158461 A1 * | 7/2007 | Rymer | B65D 81/3283 239/302 |
| 2007/0289999 A1 | 12/2007 | Rossignol | |
| 2008/0149126 A1 | 6/2008 | Abergel | |
| 2008/0277419 A1 | 11/2008 | Holcomb et al. | |
| 2008/0277425 A1 * | 11/2008 | Grasser | B01F 3/04446 222/190 |
| 2009/0308890 A1 | 12/2009 | Saravis | |
| 2011/0036867 A1 | 2/2011 | Flores | |

FOREIGN PATENT DOCUMENTS

| | | |
|---|---|---|
| FR | 2 665 420 | 2/1992 |
| GB | 2 307 674 | 6/1997 |
| JP | S59 155978 | 10/1984 |
| JP | H05 16681 | 3/1993 |
| JP | H09 20358 | 1/1997 |
| JP | H09 226785 | 9/1997 |
| JP | 2006 264767 | 10/2006 |
| WO | WO 2011/056173 | 5/2011 |
| WO | WO 2012/082138 | 6/2012 |

OTHER PUBLICATIONS

Written Opinion of the International Preliminary Examining Authority issued in International Application PCT/US2012/065748 mailed Nov. 12, 2014.

* cited by examiner

MULTI-CHAMBER CONTAINER

CROSS-REFERENCE TO RELATED PATENT APPLICATIONS

This application is a U.S. national stage application under 35 U.S.C. §371 of PCT Application No. PCT/US2012/65748, filed Nov. 19, 2012, the entirety of which is incorporated herein by reference.

FIELD OF THE INVENTION

The present invention relates to a multi-chamber container. The multiple chambers of the container may store respective flowable substances, for example, respective oral care products such as mouthwashes or respective components of a mouthwash.

BACKGROUND OF THE INVENTION

A multi-chamber container is a container having more than one chamber for storing respective substances out of contact with one another. It may be desirable to keep the respective substances out of contact with one another during storage of the respective substances, for example if the substances might react or deteriorate over time should they be allow to mix.

Over the years, efforts have been made to improve the design of multi-chamber containers to enable a user to control a ratio of dispensed volumes of plural flowable substances stored in respective chambers of a multi-chamber container. For example, it is known to provide a two-compartment container of flexible material, which enables a user to applying differing magnitudes of force to the two compartments, in an attempt to cause different volumes of flowable substances stored in the compartments to be dispensed.

However, while in theory such a container should provide a user with a sufficient degree of control of the ratio, in reality the degree of control provided often is insufficient. For example, applying a force to one compartment of the container may inadvertently cause some component of force to be applied to the other compartment of the container, so the user cannot be certain as to the relative forces they are applying to the compartments.

Therefore, despite these efforts, a need still exists for multi-chamber container with a structure that better enables a user to control a ratio of dispensed volumes of plural separately-stored flowable substances.

SUMMARY OF THE INVENTION

A first aspect of the present invention provides a multi-chamber container for dispensing flowable substances, comprising: a rigid body disposed around first and second storage chambers for storing respective first and second flowable substances, a first inlet fluidly connecting the first storage chamber with a first outlet, a second inlet fluidly connecting the second storage chamber with a second outlet, a first user-operable apparatus at an exterior of the container and configured, on movement relative to the rigid body, to cause a volume of the first flowable substance to be dispensed from the first storage chamber via the first inlet to the first outlet, and a second user-operable apparatus at the exterior of the container and configured, on movement relative to the rigid body, to cause a volume of the second flowable substance to be dispensed from the second storage chamber via the second inlet to the second outlet.

Although the rigid body is "disposed around" the first and second storage chambers, it is not essential that the body fully encases the first and second storage chambers so that the first and second storage chambers are isolated from an exterior of the body by the body alone.

Preferably, the first and second user-operable apparatuses are movable relative to the rigid body independently of each other.

Preferably, the first and second user-operable apparatuses are moveable over equal distances relative to the rigid body to cause equal volumes of the respective first and second flowable substances to be dispensed from the respective first and second storage chambers via the respective first and second inlets to the respective first and second outlets.

Preferably, the first and second user-operable apparatuses are moveable over unequal distances relative to the rigid body to cause unequal volumes of the respective first and second flowable substances to be dispensed from the respective first and second storage chambers via the respective first and second inlets to the respective first and second outlets.

Optionally, the rigid body defines first and second windows, and the first and second user-operable apparatuses are disposed in the respective first and second windows and movable relative to the respective first and second windows.

Preferably, movement of the first user-operable apparatus relative to the first window causes a reduction in volume of the first storage chamber. Preferably, movement of the second user-operable apparatus relative to the second window causes a reduction in volume of the second storage chamber.

The first and second user-operable apparatuses may comprise respective sheets of resilient material, such as an elastomeric material, covering the respective first and second windows.

Optionally, movement of the first user-operable apparatus towards the second user-operable apparatus causes the volume of the first flowable substance to be dispensed from the first storage chamber via the first inlet to the first outlet, and movement of the second user-operable apparatus towards the first user-operable apparatus causes the volume of the second flowable substance to be dispensed from the second storage chamber via the second inlet to the second outlet.

Optionally, movement of the first user-operable apparatus towards a longitudinal plane of the body causes the volume of the first flowable substance to be dispensed from the first storage chamber via the first inlet to the first outlet, and movement of the second user-operable apparatus towards the longitudinal plane of the body causes the volume of the second flowable substance to be dispensed from the second storage chamber via the second inlet to the second outlet.

Optionally, the first and second user-operable apparatuses are disposed at opposite lateral sides of the container.

Optionally, the first and second user-operable apparatuses are biased away from each other.

Optionally, the first and second user-operable apparatuses are movable in the same direction relative to the rigid body to cause the respective volumes of the first and second flowable substances to be dispensed from the respective first and second storage chambers via the respective first and second inlets to the respective first and second outlets.

Optionally, movement of the first user-operable apparatus towards a lateral plane of the body causes the volume of the first flowable substance to be dispensed from the first storage chamber via the first inlet to the first outlet, and movement of the second user-operable apparatus towards the lateral plane of the body causes the volume of the second flowable substance to be dispensed from the second storage chamber via the second inlet to the second outlet. Optionally, the first and second user-operable apparatuses are biased away from the lateral plane relative to the rigid body.

Optionally, the first and second user-operable apparatuses are biased in the same direction relative to the rigid body.

Optionally, the container comprises a base face, and the first and second storage chambers are disposed between the base face and the first and second user-operable apparatuses.

The first and second user-operable apparatuses may be disposed together at a longitudinal end of the container.

Optionally, each of the first and second user-operable apparatuses comprises a respective semi-circular feature, and the respective semi-circular features are disposed so as to together define a circular feature of the container.

Optionally, the first user-operable apparatus comprises the first outlet and the second user-operable apparatus comprises the second outlet.

Preferably, the first outlet is separate from the second outlet. Preferably, the first and second outlets are respective openings to the exterior of the container.

Optionally, the first and second storage chambers are chambers in respective non-unitary first and second vessels of the body. Optionally, the first outlet and the second outlet are defined by an apparatus that is non-unitary with the first and second vessels and is attached to the first and second vessels. Optionally, the apparatus defining the first outlet and the second outlet comprises a collar attached to the first and second vessels, wherein the first and second user-operable apparatuses are connected to the collar and movable relative to the collar. Alternatively, the first and second storage chambers are respective chambers in a unitary vessel of the body. Optionally, the first outlet and the second outlet are defined by an apparatus that is non-unitary with the unitary vessel and is attached to the unitary vessel. Optionally, the apparatus defining the first outlet and the second outlet comprises a collar attached to the unitary vessel, wherein the first and second user-operable apparatuses are connected to the collar and movable relative to the collar.

Preferably, the container comprises a base face, and the first and second storage chambers are disposed between the base face and the first and second outlets. Preferably, the first and second storage chambers are disposed in parallel between the base face and the first and second outlets.

Optionally, the container is elongate with a base face and a longitudinal axis that extends through the base face. Preferably, the longitudinal axis is orthogonal to the base face.

Preferably, the first user-operable apparatus comprises a first pump and the second user-operable apparatus comprises a second pump.

Optionally, the first inlet comprises a first dip tube extending to the first storage chamber, and the second inlet comprises a second dip tube extending to the second storage chamber.

DETAILED DESCRIPTION OF THE PREFERRED EMBODIMENTS

The following description of the preferred embodiments is merely exemplary in nature and is in no way intended to limit the invention, its application, or uses. The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features.

Figure 1:
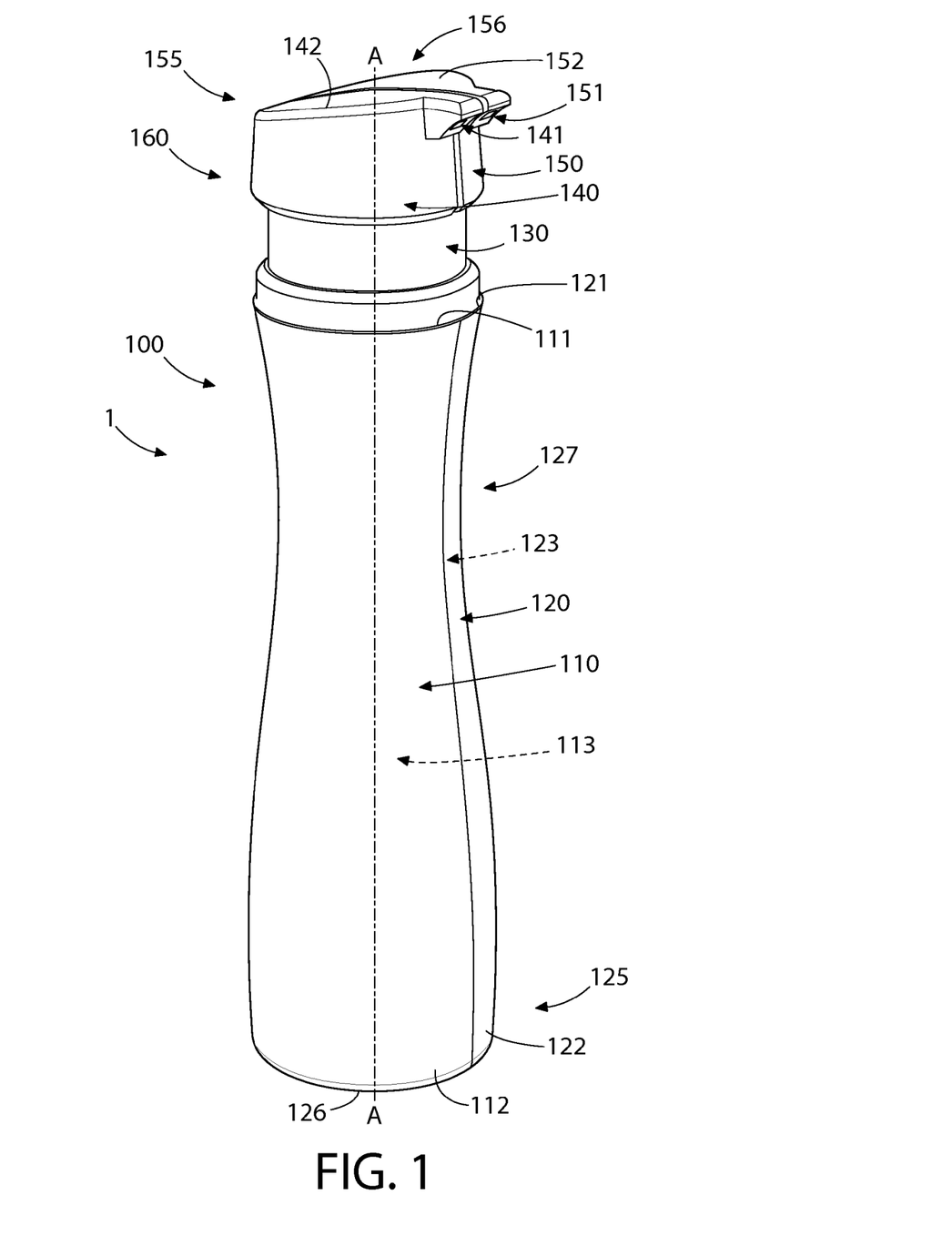
FIG. 1 is a perspective view of a multi-chamber container according to a first embodiment of the present invention, shown with each of its two user-operable apparatuses in a non-actuated state.
Figure 2:
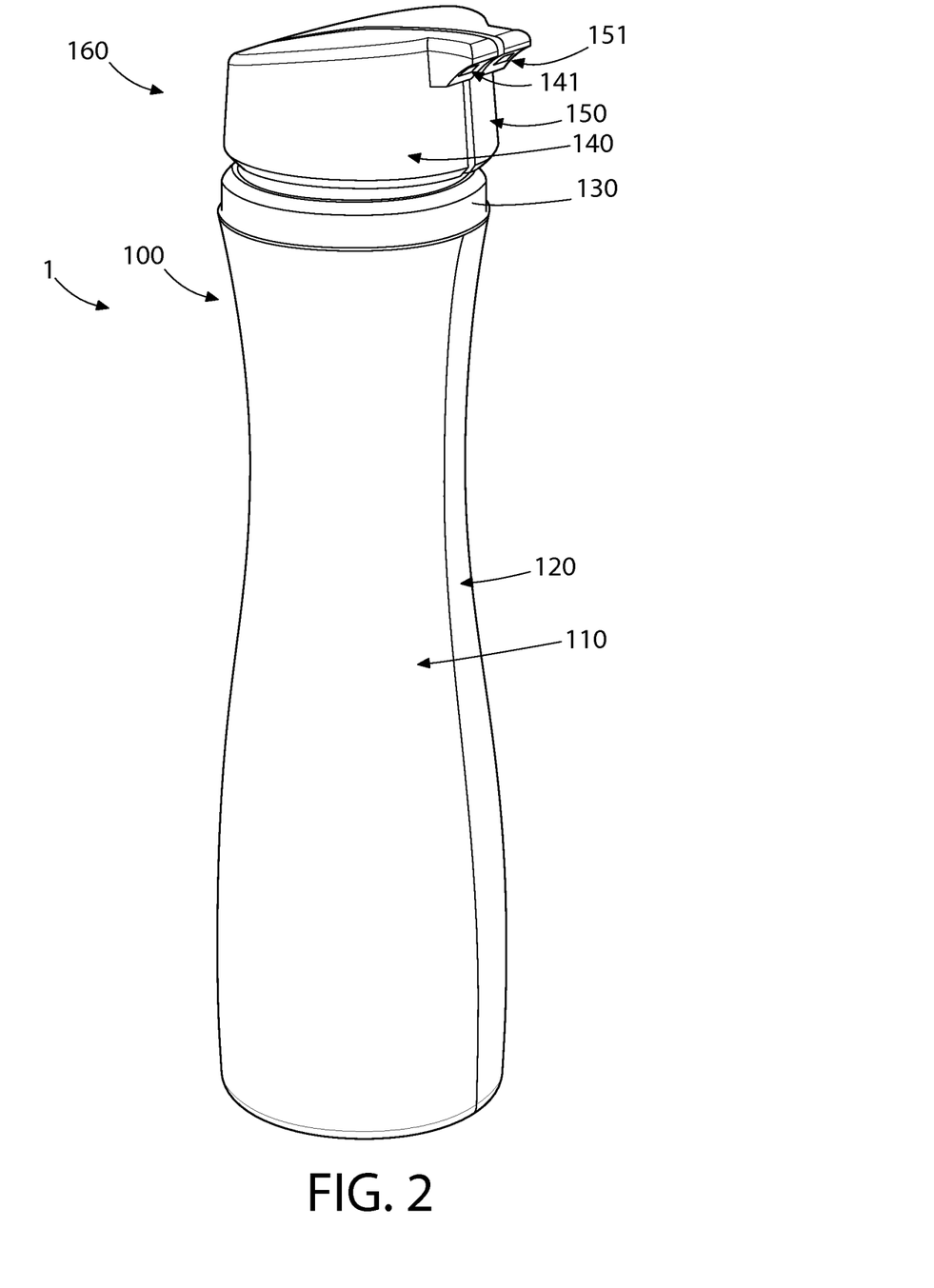
FIG. 2 is a perspective view of the multi-chamber container of FIG. 1, shown with each of its two user-operable apparatuses in an actuated state.
Figure 3:
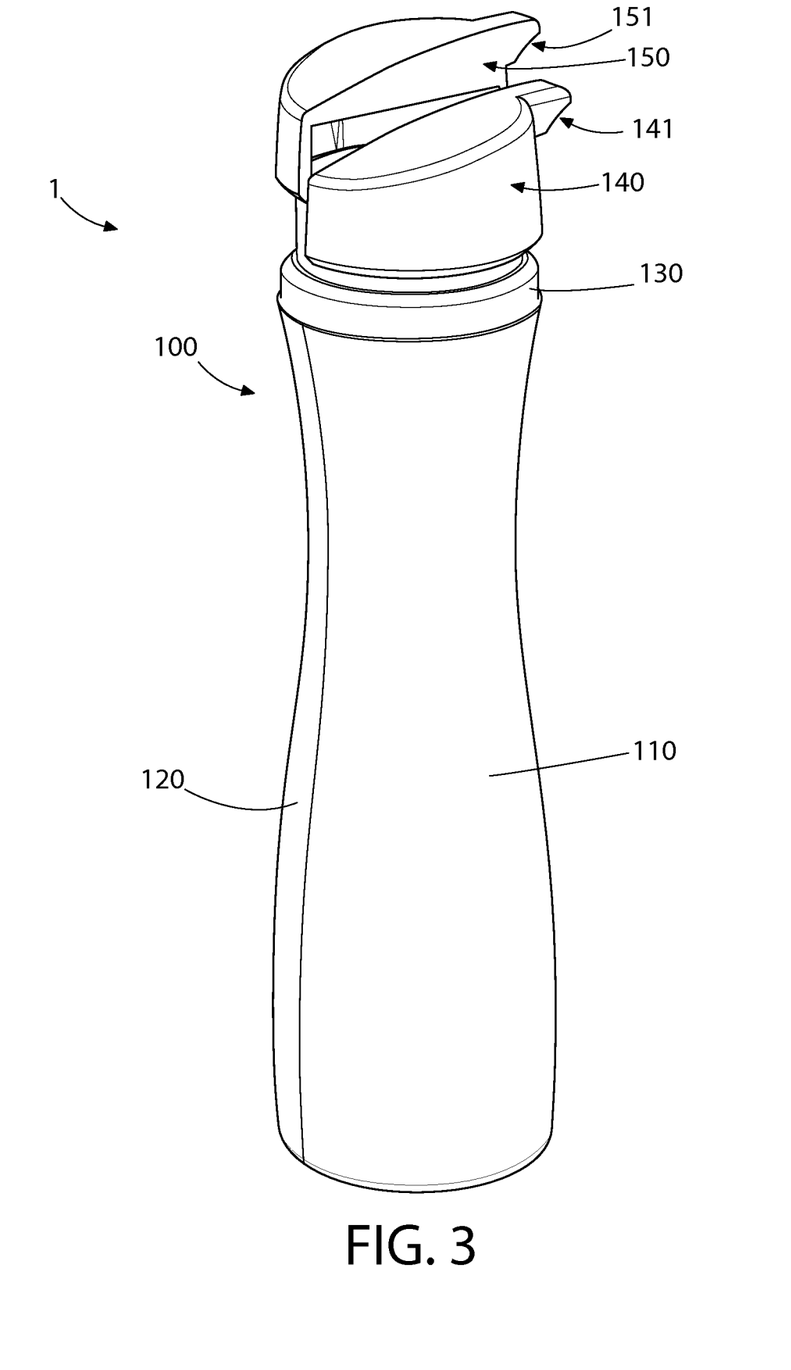
FIG. 3 is a perspective view of the multi-chamber container of FIG. 1, shown with one of its two user-operable apparatuses in a non-actuated state and the other of its two user-operable apparatuses in an actuated state.

A multi-chamber container for dispensing flowable substances and according to a first embodiment of the present invention will be described with reference to FIGS. 1 to 3.

The container 1 comprises a rigid body 100 that is disposed around first and second storage chambers 113, 123, each of which storage chambers 113, 123 is for storing a flowable substance, or stores a flowable substance, such as a liquid or a paste. The storage chambers 113, 123 keep the flowable substances separate from each other, so there is no mixing of the flowable substances in the container 1. The flowable substances may each be an oral care product, such as a mouthwash. Alternatively, the flowable substances may be two respective parts of an oral care product, such as a mouthwash, that is created when the flowable substances are mixed outside of the container 1.

More specifically, the first and second storage chambers 113, 123 are defined by respective first and second vessels 110, 120 of the rigid body 100. The first and second vessels 110, 120 have respective orifices (not shown) at a first small end 111, 121 thereof. Each of the first and second vessels 110, 120 has a second small end 112, 122 at an end opposite to the first small end 111, 121 thereof. Together, the second small ends 112, 122 form a base end 125 of the container 1, which is one longitudinal end of the container 1. The base end 125 of the container 1 has a base face 126, upon which the container 1 may stand on a surface.

Each of the first and second vessels 110, 120 is elongate between its first and second small ends 111, 112, 121, 122. The first and second vessels 110, 120 are made from a hard, rigid, material. The first and second vessels 110, 120 are non-unitary. That is, the first and second vessels 110, 120 are not integrally formed together, but instead are separate components that are connected together during assembly of the container 1. In a variation to the illustrated embodiment, the first and second storage chambers 113, 123 may be respective chambers in a single, unitary vessel. Such a single, unitary vessel would be made from a hard, rigid, material.

The container 1 further comprises an apparatus 160 that is non-unitary with the first and second vessels 110, 120. The apparatus 160 comprises a collar 130 and first and second user-operable apparatuses 140, 150 that are connected to the collar 130 and that are movable relative to the collar 130 between respective non-actuated positions (see FIG. 1) and respective actuated positions (see FIG. 2), as will be described in more detail below. The first and second user-operable apparatuses 140, 150 are provided at an exterior of the container 1 for contact with a user's hand during use of the container 1.

Overall, the container 1 is elongate with a longitudinal axis A-A that extends through the base face 126 and through the collar 130 of the apparatus 160. The collar 130 has a circular outer surface and is concentric with the longitudinal axis A-A. In this embodiment, the longitudinal axis A-A is orthogonal to the base face 126. However, in variations to this embodiment, the longitudinal axis A-A may be non-orthogonal to the base face 126. Further, the container 1 has an hourglass shape, which enables a user to take a firm hold of the container 1 during transport. In this embodiment, the hourglass shape is achieved by the first and second vessels 110, 120 together defining a waist 127 of the container 1, which waist 127 has a smaller lateral cross sectional area than each of the base end 125 and the collar 130.

The apparatus 160 defines first and second outlets 141, 151 that are separate from each other and that are respective openings to the exterior of the container 1. More specifically, the first user-operable apparatus 140 comprises and defines the first outlet 141, and the second user-operable apparatus 150 comprises and defines the second outlet 151. It is via the first and second outlets 141, 151 that the respective first and second flowable substances are dispensable from the container 1 without mixing in the container 1. The first and second flowable substances are permitted to mix only outside of the container 1. The first and second user-operable apparatuses 140, 150 are disposed together at another longitudinal end 155 of the container 1, which is a longitudinal end of the container 1 opposite to the base end 125. Each of the first and second user-operable apparatuses 140, 150 has a semi-circular end face 142, 152 at the longitudinal end of the container 1, and the respective semi-circular end faces 142, 152 of the first and second user-operable apparatuses 140, 150 are disposed so as to together define a circular longitudinal end face 156 of the container 1. From at least FIG. 1, it will be noted that each of the first and second outlets 141, 151 faces away from the end face 156 of the container 1, so as to minimize risk of the dispensed substances contacting a user's hand, which would be in contact with one or both of the end faces 142, 152. The first and second outlets 141, 151 face in parallel directions.

The apparatus 160 is attached to the first and second vessels 110, 120 during assembly of the container 1. More specifically, during assembly of the multi-chamber container 1, the first and second vessels 110, 120 are brought into contact with each other, their respective first small ends 111, 121 and orifices are inserted into a respective receiving hole (not shown) formed in a first side of the collar 130 of the apparatus 160, and then the respective first small ends 111, 121 of the first and second vessels 110, 120 are fixed to the collar 130, such as by adherence using adhesive or by sonic welding the collar 130 to the first and second vessels 110, 120. Accordingly, in the assembled container 1, the first and second storage chambers 113, 123 are disposed in parallel between the base face 126 and the apparatus 160. More specifically, the first and second storage chambers 113, 123 are disposed in parallel between base face 126 and the collar 130, and in parallel between base face 126 and the first and second user-operable apparatuses 140, 150. Given that the first and second user-operable apparatuses 140, 150 define the respective first and second outlets 141, 151, the first and second storage chambers 113, 123 also are disposed in parallel between base face 126 and the first and second outlets 141, 151.

In the variation in which the first and second storage chambers 113, 123 are respective chambers in a single, unitary vessel, the apparatus 160 may be non-unitary with the single, unitary vessel, and may be attached to the single, unitary vessel during assembly of the container 1.

The container 1 further comprises a first inlet (not shown) fluidly connecting the first storage chamber 113 with the first outlet 141, and a second inlet (not shown) fluidly connecting the second storage chamber 123 with the second outlet 151. Optionally, the first inlet comprises a first dip tube extending to the first storage chamber 113 and the second inlet comprises a second dip tube extending to the second storage chamber 123.

The first and second user-operable apparatuses 140, 150 are resiliently connected to the collar 130. In this embodiment, this is achieved by providing a resilient element, such as a helical spring, between each of the first and second user-operable apparatuses 140, 150 and the collar 130. Preferably, the collar 130 has one or more features that cooperate with features of the first and second user-operable apparatuses 140, 150 to guide the movement of the first and second user-operable apparatuses 140, 150 relative to the collar 130 and relative to the body 100, as discussed in detail below.

As the collar 130 is connected to the rigid body 100, the first and second user-operable apparatuses 140, 150 also are resiliently connected to the body 100. The first user-operable apparatus 140 is configured, on movement relative to the rigid body 100 from an non-actuated state (see FIG. 1) to an actuated state (see FIG. 2 or FIG. 3), to cause a volume of the first flowable substance to be dispensed from the first storage chamber 113 via the first inlet to the first outlet 141. The first user-operable apparatus 140 may comprise, or be connected to, a first pump that is operable to pump the first flowable substance from the first storage chamber 113 to the first outlet 141. Correspondingly, the second user-operable apparatus 150 is configured, on movement relative to the rigid body 100 from an non-actuated state (see FIG. 1) to an actuated state (see FIG. 2), to cause a volume of the second flowable substance to be dispensed from the second storage chamber 123 via the second inlet to the second outlet 151. The second user-operable apparatus 150 may comprise, or be connected to, a second pump that is operable to pump the second flowable substance from the second storage chamber 123 to the second outlet 151.

The first and second user-operable apparatuses 140, 150 are movable in the same direction relative to the rigid body 100 to cause the respective volumes of the first and second flowable substances to be dispensed from the respective first and second storage chambers 113, 123 via the respective first and second inlets to the respective first and second outlets 141, 151. More specifically, the first and second user-operable apparatuses 140, 150 are each movable in a linear, longitudinal direction towards the base end 125 of the container 1 from their respective non-actuated states to their respective actuated states. On the other hand, the first and second user-operable apparatuses 140, 150 also are biased, by the respective resilient elements, in the same direction relative to the rigid body 100. More specifically, the first and second user-operable apparatuses 140, 150 are each biased in a linear, longitudinal direction away from the base end 125 of the container 1 from their respective actuated states to their respective non-actuated states.

The body 100 can be considered to have a lateral plane (not shown), which extends perpendicularly to the longitudinal axis A-A at a location between the first small ends 111, 121 and the second small ends 112, 122 of the vessels 110, 120. Movement of the first user-operable apparatus 140 towards the lateral plane of the body 100 (and towards the base end 125 of the container 1) causes the volume of the first flowable substance to be dispensed from the first storage chamber 113 via the first inlet to the first outlet 141, and movement of the second user-operable apparatus 150 towards the lateral plane of the body 100 (and towards the base end 125 of the container 1) causes the volume of the second flowable substance to be dispensed from the second storage chamber 123 via the second inlet to the second outlet 151.

Importantly in this embodiment, the first and second user-operable apparatuses 140, 150 are movable relative to the rigid body 100 independently of each other, so that a user is able selectively to dispense only one, or both, of the first and second flowable substances at any one time. The user also is able selectively to dispense different volumes of the first and second flowable substances at any one time, so that the user can select the ratio of the first and second flowable substances to be dispensed. The first and second user-operable apparatuses 140, 150 are moveable over equal distances, relative to the rigid body 100 and from their respective non-actuated positions, to cause equal volumes of the respective first and second flowable substances to be dispensed from the respective first and second storage chambers 113, 123 via the respective first and second inlets to the respective first and second outlets 141, 151. Moreover, the first and second user-operable apparatuses 140, 150 are moveable over unequal distances, relative to the rigid body 100 and from their respective non-actuated positions, to cause unequal volumes of the respective first and second flowable substances to be dispensed from the respective first and second storage chambers 113, 123 via the respective first and second inlets to the respective first and second outlets 141, 151. The first and second user-operable apparatuses 140, 150 are biased away from the lateral plane relative to the rigid body 100 by the respective resilient elements.

When a user wishes to dispense the first of the flowable substances from the container 1, they move the first user-operable apparatus 140 relative to the body 100 from its non-actuated state to its actuated state against the biasing force provided against such movement by the resilient element disposed between the first user-operable apparatus 140 and the collar 130. This causes the first flowable substance to flow from the first storage chamber 113 to the first outlet 141. The distance over which the first user-operable apparatus 140 is moved relative to the body 100 determines the volume of the first flowable substance that is dispensed from the first outlet 141. Similarly, when the user wishes to dispense the second flowable substance, they carry out corresponding operations with the second user-operable apparatus 150 against the biasing force provided by the resilient element disposed between the second user-operable apparatus 150 and the collar 130. If the user wishes to dispense volumes of each of the first and second flowable substances, they carry out corresponding operations with both the first and second user-operable apparatuses 140, 150, controlling the degree to which each the first and second user-operable apparatuses 140, 150 is moved from its respective non-actuated positions to determine the ratio of the first and second flowable substances to be dispensed.

Since the body 100 of the container 1 is rigid, and since two separate user-operable apparatuses 140, 150 are provided at an exterior of the container 1 for dispensing the respective first and second substances, it can be provided that no force applied by a user to one of the user-operable apparatuses 140, 150 causes any degree of actuation of the other of the user-operable apparatuses 140, 150. Accordingly, the container 1 enables a user to control a ratio of dispensed volumes of the separately-stored flowable substances.

Figure 4:
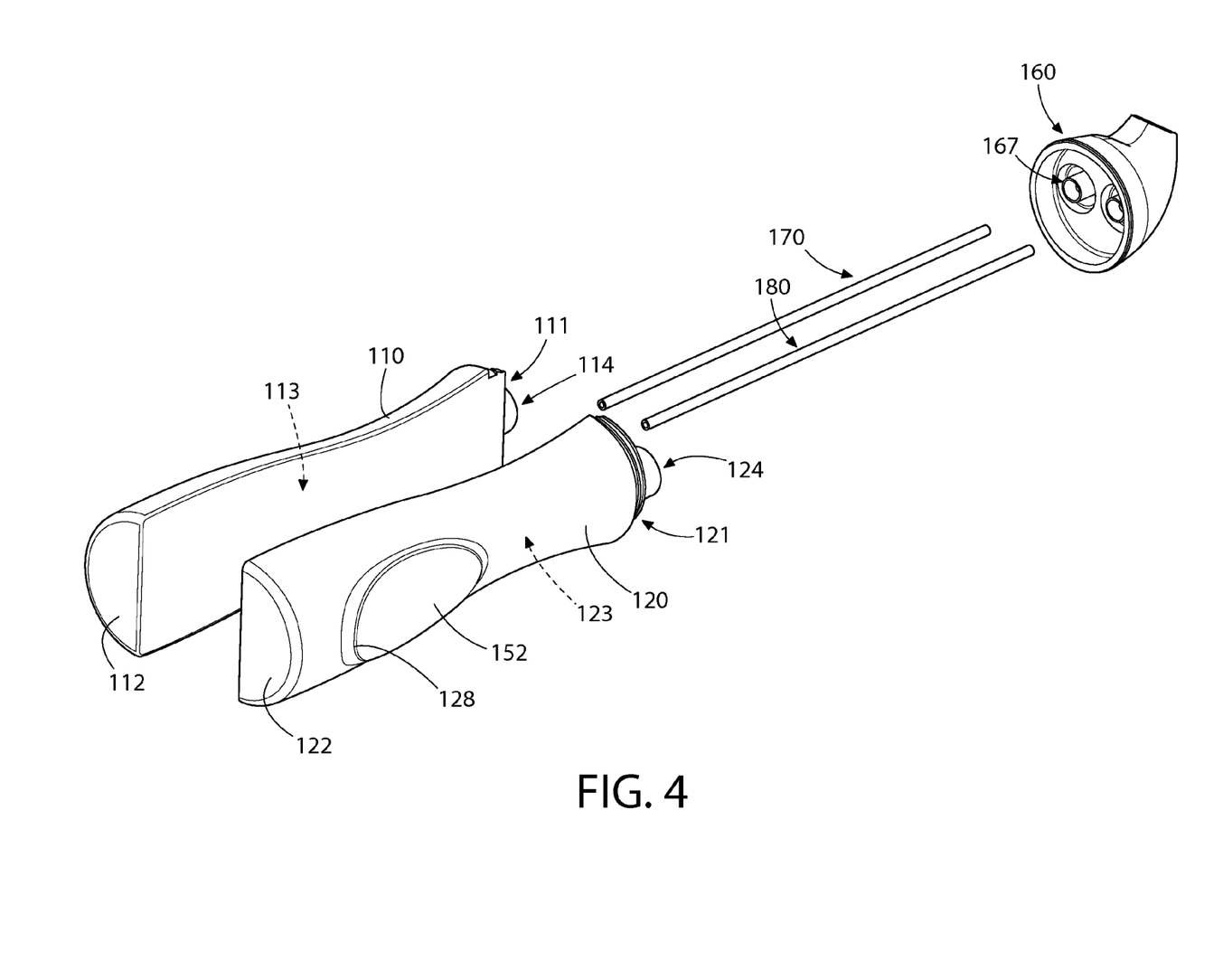
FIG. 4 is an exploded view of components of a multi-chamber container according to a second embodiment of the present invention.
Figure 5:
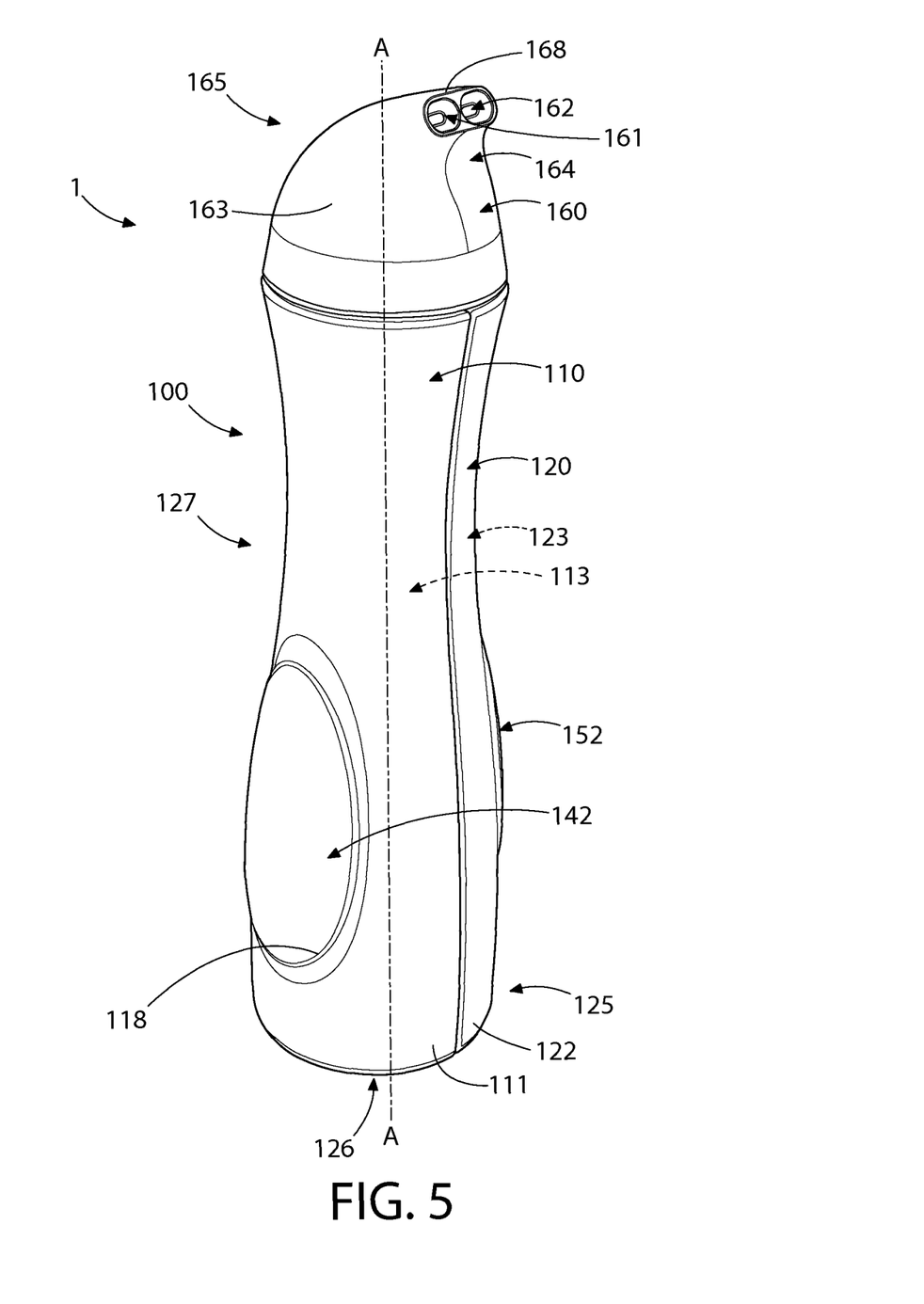
FIG. 5 is a perspective view showing the components of FIG. 4 assembled to form the multi-chamber container according to the second embodiment of the present invention.

A multi-chamber container for dispensing flowable substances and according to a second embodiment of the present invention will be described with reference to FIGS. 4 and 5.

The container 1 comprises a rigid body 100 that is disposed around first and second storage chambers 113, 123, each of which storage chambers 113, 123 is for storing a flowable substance, or stores a flowable substance, such as a liquid or a paste. The storage chambers 113, 123 keep the flowable substances separate from each other, so there is no mixing of the flowable substances in the container 1.

More specifically, the first storage chamber 113 is defined by the combination of a first vessel 110 of the rigid body 100 and a first sheet of resilient, (and may be elastomeric) material 142 covering a window 118 defined in a wall of the first vessel 110. Similarly, the second storage chamber 123 is defined by the combination of a second vessel 120 of the rigid body 100 and a second sheet of resilient, (and may be elastomeric) material 152 covering a window 128 defined in a wall of the second vessel 120. Accordingly, the rigid body 100 defines first and second windows 118, 128. The sheets 142, 152 are disposed in the respective first and second windows 118, 128. Therefore, it will be understood that the first and second storage chambers 113, 123 are substantially, but not completely, encased or surrounded by the rigid body 100 itself. The sheets 142, 152 are provided at an exterior of the container 1 for contact with a user's hand during use of the container 1. More specifically, the windows 118, 128 and the sheets of resilient material 142, 152 are disposed at opposite lateral sides of the container 1. The first and second sheets of resilient, (and may be elastomeric) material 142, 152 are respectively comprised in, and indeed form, first and second user-operable apparatuses 140, 150, the purpose of which will be discussed below.

The first and second vessels 110, 120 have respective orifices 114, 124 at a first small end 111, 121 thereof. Each of the first and second vessels 110, 120 has a second small end 112, 122 at an end opposite to the first small end 111, 121 thereof. Together, the second small ends 112, 122 form a base end 125 of the container 1, which is one longitudinal end of the container 1. As for the first embodiment, the base end 125 of the container 1 has a base face 126, upon which the container 1 may stand on a surface.

Each of the first and second vessels 110, 120 is elongate between its first and second small ends 111, 112, 121, 122. The first and second vessels 110, 120 are made from a hard, rigid, material. The first and second vessels 110, 120 are non-unitary. That is, the first and second vessels 110, 120 are not integrally formed together, but instead are separate components that are connected together during assembly of the container 1. In a variation to the illustrated embodiment, the first and second storage chambers 113, 123 may be respective chambers in a single, unitary vessel. Such a single, unitary vessel would be made from a hard, rigid, material.

The container 1 further comprises an apparatus 160 that is non-unitary with the first and second vessels 110, 120. The apparatus 160 comprises and defines first and second outlets 161, 162 that are separate from each other and that are respective openings to the exterior of the container 1. It is via the first and second outlets 161, 162 that the respective first and second flowable substances are dispensable from the container 1 without mixing in the container 1. The apparatus 160 is disposed at a longitudinal end 165 of the container 1, which is a longitudinal end of the container 1 opposite to the base end 125. In this embodiment, a portion 163 of the apparatus 160 has a substantially circular dome shape and the first and second outlets 161, 162 are comprised at the distal end of a spout portion 168 of the apparatus 160 that extends from the dome-shaped portion 163, with the first and second outlets 161, 162 facing in the same direction away from the dome-shaped portion 163. The apparatus 160 includes a concavity 164 formed at the junction of the dome-shaped portion 163 and the spout portion 168. This concavity 164 is able to receive a user's lower lip so as to position the spout portion 168 and the first and second outlets 161, 162 in the user's mouth, when dispensing the first and second flowable substances from the first and second outlets 161, 162 into the user's mouth. Accordingly, the risk of spilling the dispensed substances during dispensing is minimized.

Overall, the container 1 is elongate with a longitudinal axis A-A that extends through the base face 126 and through the apparatus 160. The circular dome shaped portion 163 of the apparatus 160 is concentric with the longitudinal axis A-A. In this embodiment, the longitudinal axis A-A is orthogonal to the base face 126. However, in variations to this embodiment, the longitudinal axis A-A may be non-orthogonal to the base face 126. Further, the container 1 has an hourglass shape, which enables a user to take a firm hold of the container 1 during transport. In this embodiment, the hourglass shape is achieved by the first and second vessels 110, 120 together defining a waist 127 of the container 1, which waist 127 has a smaller lateral cross sectional area than each of the base end 125 and the apparatus 160.

The apparatus 160 is attached to the first and second vessels 110, 120 during assembly of the container 1. More specifically, during assembly of the multi-chamber container 1, the first and second vessels 110, 120 are brought into contact with each other, their respective first small ends 111, 121 and orifices are each inserted into a receiving hole 167 (only one is shown in the figures) formed in a first side of the apparatus 160, and then the respective first small ends 111, 121 of the first and second vessels 110, 120 are fixed to the apparatus 160, such as by adherence using adhesive or by sonic welding the apparatus 160 to the first and second vessels 110, 120. Accordingly, in the assembled container 1, the first and second storage chambers 113, 123 are disposed in parallel between the base face 126 and the apparatus 160. Given that the apparatus 160 defines the first and second outlets 161, 162, the first and second storage chambers 113, 123 also are disposed in parallel between base face 126 and the first and second outlets 161, 162.

In the variation in which the first and second storage chambers 113, 123 are respective chambers in a single, unitary vessel, the apparatus 160 may be non-unitary with the single, unitary vessel, and may be attached to the single, unitary vessel during assembly of the container 1.

The container 1 further comprises a first inlet fluidly connecting the first storage chamber 113 with the first outlet 161, and a second inlet fluidly connecting the second storage chamber 123 with the second outlet 151. The first inlet comprises a first dip tube 170 extending to the first storage chamber 113 and the second inlet comprises a second dip tube 180 extending to the second storage chamber 123.

The first and second user-operable apparatuses 140, 150 comprising the sheets 142, 152 are movable relative to the rigid body 100, and more specifically relative to the first and second windows 118, 128, between respective non-actuated positions (see FIG. 5) and respective actuated positions (not shown). Movement of the first user-operable apparatus 140 towards the second user-operable apparatus 150 and towards a longitudinal plane (which extends parallel to the longitudinal axis A-A at a location between the first and second windows 118, 128) of the body 100, and relative to the first window 118 of the body 100, is movement of the first user-operable apparatus 140 from its non-actuated state to its actuated state, and causes a reduction in volume of the first storage chamber 113. In turn, this causes a volume of the first flowable substance to be dispensed from the first storage chamber 113 via the first inlet to the first outlet 161. Similarly, movement of the second user-operable apparatus 150 towards the first user-operable apparatus 140 and towards the longitudinal plane of the body 100, and relative to the second window 128 of the body 100, is movement of the second user-operable apparatus 150 from its non-actuated state to its actuated state, and causes a reduction in volume of the second storage chamber 123. In turn, this causes a volume of the second flowable substance to be dispensed from the second storage chamber 123 via the second inlet to the second outlet 162. Accordingly, the first and second user-operable apparatuses 140, 150 can be considered respective first and second pumps configured to pump the first and second flowable substances from the first and second storage chambers 113, 123 to the first and second outlets 161, 162.

The inherent resilience of the sheets 142, 152 means that movement of the first user-operable apparatus 140 from the non-actuated position to the actuated position is against a biasing force provided by the first sheet 142 itself, and movement of the second user-operable apparatus 150 from the non-actuated position to the actuated position is against a biasing force provided by the second sheet 152 itself. Moreover, since the windows 118, 128 and the sheets 142, 152 are disposed at opposite lateral sides of the container 1, the first and second user-operable apparatuses 140, 150 are moveable in opposite directions towards each another to reach their respective actuated states, and are biased away from each other in opposite directions away from the longitudinal plane of the body 100 towards their respective non-actuated states.

As for the first embodiment, the first and second user-operable apparatuses 140, 150 are movable relative to the rigid body 100 independently of each other, so that a user is able selectively to dispense only one, or both, of the first and second flowable substances at any one time. The user also is able selectively to dispense different volumes of the first and second flowable substances at any one time, so that the user can select the ratio of the first and second flowable substances to be dispensed. The first and second user-operable apparatuses 140, 150 are moveable over equal distances relative to the rigid body 100 and from their respective non-actuated positions to cause equal volumes of the respective first and second flowable substances to be dispensed from the respective first and second storage chambers 113, 123 via the respective first and second inlets to the respective first and second outlets 161, 162. Moreover, the first and second user-operable apparatuses 140, 150 are moveable over unequal distances relative to the rigid body 100 and from their respective non-actuated positions to cause unequal volumes of the respective first and second flowable substances to be dispensed from the respective first and second storage chambers 113, 123 via the respective first and second inlets to the respective first and second outlets 161, 162.

When a user wishes to dispense the first of the flowable substances from the container 1, they move the first user-operable apparatus 140 relative to the body 100 from its non-actuated state to its actuated state. In other words, the user presses the first sheet 142 inwards towards the longitudinal plane of the body 100. This causes the first flowable substance to flow from the first storage chamber 113 to the first outlet 161. The distance over which the first user-operable apparatus 140 is moved relative to the body 100 determines the volume of the first flowable substance that is dispensed from the first outlet 161. Similarly, when the user wishes to dispense the second flowable substance, they carry out corresponding operations with the second user-operable apparatus 150. In other words, the user presses the second sheet 152 inwards towards the longitudinal plane of the body 100. If the user wishes to dispense volumes of each of the first and second flowable substances, they carry out corresponding operations with both the first and second user-operable apparatuses 140, 150, controlling the degree to which the first and second user-operable apparatuses 140, 150 are moved from their respective non-actuated positions to determine the ratio of the first and second flowable substances to be dispensed. The user presses the first and second sheets 142, 152 towards each other, to cause dispensing of both the first and second flowable substances.

Similarly to the first embodiment, since the body 100 of the container 1 of the second embodiment is rigid, and since two separate user-operable apparatuses 140, 150 are provided at an exterior of the container 1 for dispensing the respective first and second substances, it can be provided that no force applied by a user to one of the user-operable apparatuses 140, 150 causes any degree of actuation of the other of the user-operable apparatuses 140, 150. Accordingly, the container 1 enables a user to control a ratio of dispensed volumes of the separately-stored flowable substances.

In a variation to the second embodiment, the first and second sheets 142, 152 may be sheets of rigid material that are resiliently connected to the body 100, such as by respective springs connected between first vessel 110 and the first sheet 142 and between the second vessel 120 and the second sheet 152. In such a variation, the first and second sheets 142, 152 still are disposed in the first and second windows 118, 128, and are biased in opposite directions away from each other by the respective springs. Moreover, movement of the first and second sheets 142, 152 towards each other causes a reduction in volume of each of the first and second storage chambers 113, 123, which in turn causes respective volumes of the first and second flowable substances to be dispensed from the first and second storage chambers 113, 123 via the first and second inlets to the first and second outlets 161, 162.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the scope of the invention should be construed broadly as set forth in the appended claims.

The invention claimed is:

1. A multi-chamber container for dispensing flowable substances, comprising:
    a rigid body disposed around first and second storage chambers for storing respective first and second flowable substances, wherein the rigid body defines first and second windows,
    a first inlet fluidly connecting the first storage chamber with a first outlet,
    a second inlet fluidly connecting the second storage chamber with a second outlet,
    a first user-operable apparatus comprising a first sheet of resilient material at an exterior of the container and configured, on movement relative to the rigid body, to cause a volume of the first flowable substance to be dispensed from the first storage chamber via the first inlet to the first outlet, and
    a second user-operable apparatus comprising a second sheet of resilient material at the exterior of the container and configured, on movement relative to the rigid body, to cause a volume of the second flowable substance to be dispensed from the second storage chamber via the second inlet to the second outlet,
    wherein the first and second storage chambers are chambers in respective non-unitary first and second vessels of the body,
    wherein the first window is defined in a wall of the first vessel and the second window is defined in a wall of the second vessel,
    and wherein the first sheet of resilient material and the second sheet of resilient material cover the respective first and second windows and are movable relative to the respective first and second windows.

2. The container of claim 1, wherein the first and second user-operable apparatuses are movable relative to the rigid body independently of each other.

3. The container of claim 1, wherein the first and second user-operable apparatuses are moveable over equal distances relative to the rigid body to cause equal volumes of the respective first and second flowable substances to be dispensed from the respective first and second storage chambers via the respective first and second inlets to the respective first and second outlets.

4. The container of claim 1, wherein the first and second user-operable apparatuses are moveable over unequal distances relative to the rigid body to cause unequal volumes of the respective first and second flowable substances to be dispensed from the respective first and second storage chambers via the respective first and second inlets to the respective first and second outlets.

5. The container of claim 4, wherein movement of the first user-operable apparatus relative to the first window causes a reduction in volume of the first storage chamber, and movement of the second user-operable apparatus relative to the second window causes a reduction in volume of the second storage chamber.

6. The container of claim 1, wherein the resilient material comprises an elastomeric material.

7. The container of claim 1, wherein movement of the first user-operable apparatus towards the second user-operable apparatus causes the volume of the first flowable substance to be dispensed from the first storage chamber via the first inlet to the first outlet, and wherein movement of the second user-operable apparatus towards the first user-operable apparatus causes the volume of the second flowable substance to be dispensed from the second storage chamber via the second inlet to the second outlet.

8. The container of claim 1, wherein movement of the first user-operable apparatus towards a longitudinal plane of the body causes the volume of the first flowable substance to be dispensed from the first storage chamber via the first inlet to the first outlet, and wherein movement of the second user-operable apparatus towards the longitudinal plane of the body causes the volume of the second flowable substance to be dispensed from the second storage chamber via the second inlet to the second outlet.

9. The container of claim 1, wherein the first and second user-operable apparatuses are disposed at opposite lateral sides of the container.

10. The container of claim 1, wherein the first and second user-operable apparatuses are biased away from each other.

11. The container of claim 1, wherein the first outlet is separate from the second outlet.

12. The container of claim 1 comprising a base face, wherein the first and second storage chambers are disposed between the base face and the first and second outlets.

13. The container of claim 12, wherein the first and second storage chambers are disposed in parallel between the base face and the first and second outlets.

14. The container of claim 1, wherein the container is elongate with a base face and a longitudinal axis that extends through the base face.

15. The container of claim 14, wherein the longitudinal axis is orthogonal to the base face.

16. The container of claim 1, wherein the first user-operable apparatus comprises a first pump and the second user-operable apparatus comprises a second pump.

17. The container of claim 1, wherein the first inlet comprises a first dip tube extending to the first storage chamber, and the second inlet comprises a second dip tube extending to the second storage chamber.

18. A multi-chamber container for dispensing flowable substances, comprising:
a rigid body disposed around first and second storage chambers for storing respective first and second flowable substances,
a first inlet fluidly connecting the first storage chamber with a first outlet,
a second inlet fluidly connecting the second storage chamber with a second outlet,
a first user-operable apparatus at an exterior of the container and configured, on movement relative to the rigid body, to cause a volume of the first flowable substance to be dispensed from the first storage chamber via the first inlet to the first outlet,
a second user-operable apparatus at the exterior of the container and configured, on movement relative to the rigid body, to cause a volume of the second flowable substance to be dispensed from the second storage chamber via the second inlet to the second outlet, and
a further apparatus which is non-unitary with the first and second storage chambers,
wherein a portion of the further apparatus has a substantially circular shape, and the first and second outlets are comprised at a distal end of a spout portion of the further apparatus that extends from the portion of the further apparatus, with the first and second outlets facing in the same direction away from the portion of the further apparatus,
and wherein the further apparatus defines the first outlet and the second outlet and comprises a collar attached to the rigid body, wherein the first and second user-operable apparatuses are connected to the collar and movable in the same direction relative to the collar.

19. The container of claim 18, wherein the first and second user-operable apparatuses are movable in the same direction relative to the rigid body to cause the respective volumes of the first and second flowable substances to be dispensed from the respective first and second storage chambers via the respective first and second inlets to the respective first and second outlets.

20. The container of claim 19, wherein movement of the first user-operable apparatus towards a lateral plane of the body causes the volume of the first flowable substance to be dispensed from the first storage chamber via the first inlet to the first outlet, and wherein movement of the second user-operable apparatus towards the lateral plane of the body causes the volume of the second flowable substance to be dispensed from the second storage chamber via the second inlet to the second outlet.

21. The container of claim 20, wherein the first and second user-operable apparatuses are biased away from the lateral plane relative to the rigid body.

22. The container of claim 21, wherein the first and second user-operable apparatuses are biased in the same direction relative to the rigid body.

23. The container of claim 18, comprising a base face, wherein the first and second storage chambers are disposed between the base face and the first and second user-operable apparatuses.

24. The container of claim 18, wherein the first and second user-operable apparatuses are disposed together at a longitudinal end of the container.

25. The container of claim 18, wherein each of the first and second user-operable apparatuses comprises a respective semi-circular feature, and wherein the respective semi-circular features are disposed so as to together define a circular feature of the container.

26. The container of claim 18, wherein the first user-operable apparatus comprises the first outlet and the second user-operable apparatus comprises the second outlet.

27. The container of claim 18, wherein the first and second outlets are respective openings to the exterior of the container.

28. The container of claim 27, wherein the first and second storage chambers are chambers in respective non-unitary first and second vessels of the body.

29. The container of claim 18, wherein the first and second storage chambers are respective chambers in a unitary vessel of the rigid body.

30. The container of claim 29, wherein the first outlet and the second outlet are defined by the further apparatus that is attached to the unitary vessel.

31. The container of claim 30, wherein the collar is attached to the unitary vessel.

* * * * *